Aug. 18, 1970     K. MARKEL ETAL     3,524,729
APPARATUS FOR CONTINUOUSLY POLYMERIZING LACTAMS
Filed Nov. 3, 1966     4 Sheets-Sheet 1
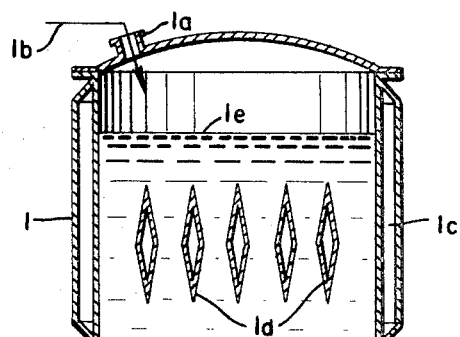
FIG. 1
FIG. 2
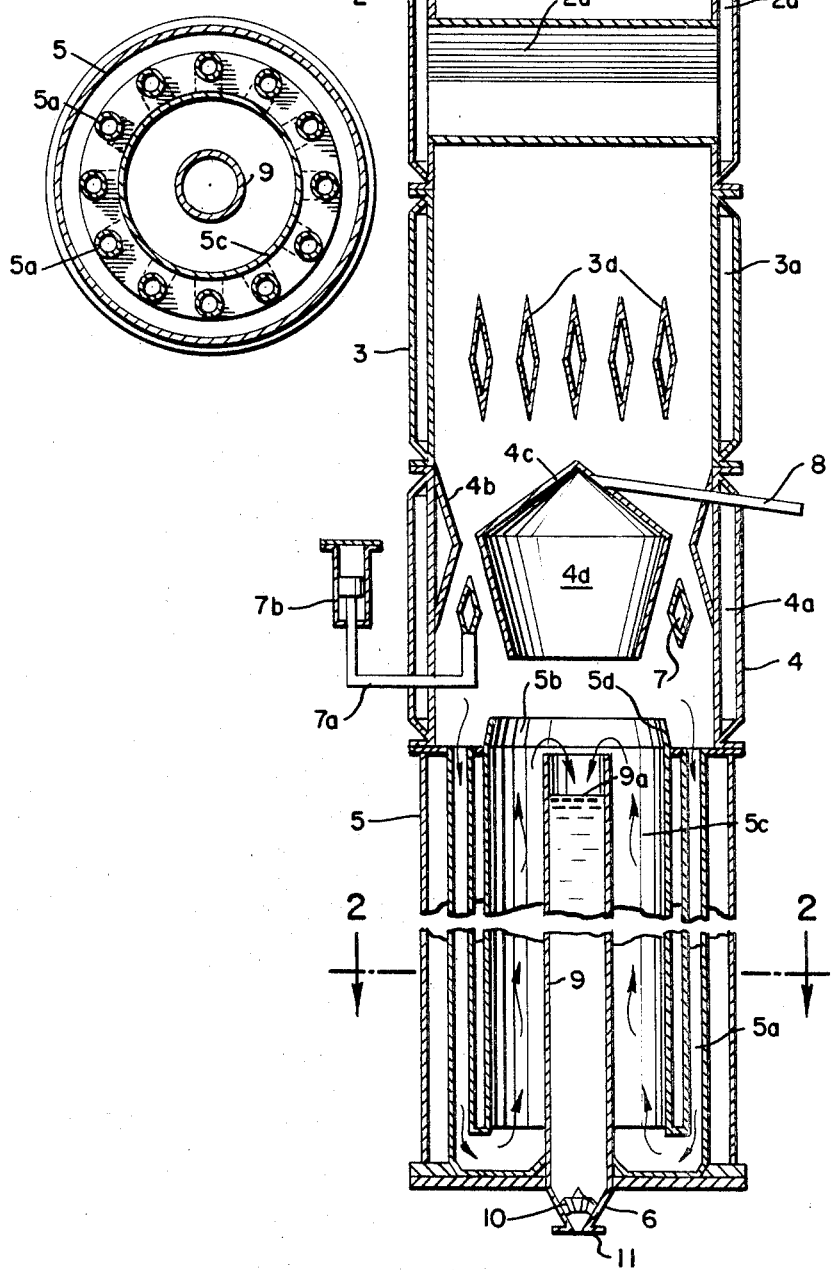
INVENTORS
KURT MARKEL et al INVENTORS
KURT MARKEL et al INVENTORS
KURT MARKEL et al INVENTORS
KURT MARKEL et al United States Patent Office 3,524,729
Patented Aug. 18, 1970

3,524,729
APPARATUS FOR CONTINUOUSLY POLYMERIZING LACTAMS
Kurt Markel, Wilhelm-Pieck-Stadt Guben, Erwin Blumer, Saalfeld, Saale, Gunter Kunzmann, Rudolstadt, and Jurgen Steinberg and Dieter Stiller, Rudolstadt-Schwarza, Germany, assignors to VEB Chemiefaserwerk Schwarza "Wilhelm Pieck," Rudolstadt, Germany
Filed Nov. 3, 1966, Ser. No. 591,833
Int. Cl. B01j 1/00; F28d 7/12
U.S. Cl. 23—285　　　　　　　　　　　　　　　　8 Claims

ABSTRACT OF THE DISCLOSURE

Apparatus for continuously polymerizing lactams into polyamides comprising sequential heat exchanging means for providing isothermal reaction temperatures and means for providing uniform flow of the reaction mixture.

The present invention relates to the polymerization of lactams.

More particularly, the present invention relates to a method and apparatus for the so-called simplified continuous polymerization of lactams, particularly E-caprolactam, into polyamides.

At the present time the greatest demands are made upon methods and apparatus for the polymerization of lactams into polyamides. Particularly in the manufacture of endless yarns it is important that the polymerisate have the greatest uniformity so as to avoid errors in the formation of the yarns, so as to avoid drawing of the yarns, and also so as to avoid unnecessary further working of the yarns which would result from defects of the latter type.

In order to carry out the simplified continuous polymerization it is customary to use a series of elongated tubular enclosures which can have a straight configuration, a U-shaped configuration, an N-shaped configuration, or a Z-type of configuration.

With the Z-type of configuration of the tubular enclosure, there is usually a vertical tube which communicates with a pair of tubes which also extend vertically and which are situated one within the other. In both of the latter tubes the liquid mixture which is to be treated flows upwardly so as to be received in the inner tube.

These known systems of tubular enclosures are provided with many different types of interior structures to control the flow of the liquid therethrough, these structures having tapered configurations or being in the form of apertured plates, as well as baffles which extend parallel to the direction of flow of the mixture, baffles which are concentrically arranged and which are of tubular configuration also being used and acting as braking surfaces to retard the flow of the mixture so as to improve the flow characteristics thereof.

There are also known systems made up of a plurality of cells where, for example, the reaction mixture is initially delivered to a lower part of a tube and, while undergoing several changes in its flow direction, is directed back and forth while the reaction is carried out. Thus, a series of U-shaped tubes can be connected in series communicating with one another so as to provide the desired reversal in the flow of the mixture.

These known tubular systems have inherent disadvantages both from the thermal standpoint as well as from the flow standpoint. Thus, the known systems have an extremely poor range of dwelling time of the mixture in the systems. It can be shown, by certain measurements, that, for example, in a Z-type of installation the range of dwelling time can vary from 5 to over 60 hours, with an average dwell time of twenty-four hours. As a result of these variations there is an unavoidable lack of homogeneity in the polymerisate, with the result that the quality of the spun goods is noticeably reduced.

In general the known simplified continuous polymerizing systems receive a reaction mixture which has a variable density with respect to the polymerisate. The result is that after the mixture is supplied to the polymerizing container, there are locally limited flow paths of least resistance through which the mixture flows in preference to taking other paths, and the result is a lack of uniform polymerizing duration for the molten part of the mixture. The most widely varied accessories which are built into these systems are not capable of suppressing this undesirable result.

Furthermore, pigment deposits collect on these built-in accessories and from time to time agglomerations of these deposits flow away from the structure on which they initially collect and result in known clumps of matter in the spinning material. Furthermore, 20–30% of the useful volume of the tubular enclosures is used primarily for heating of the reaction mixture and thus becomes unavailable for the polymerization process itself, since the known polymerizing enclosures as a rule are not technically suited for the purpose which they are intended to carry out. At the same time reaction-initiating agents which are not used during the reaction process flow to an unnecessary extent into the polymerizing enclosure and during their escape form undesirable counter-flow currents.

It is known that the polymerizing of lactam is an exothermic process. It can be shown that the reaction heat is released primarily in a relatively narrow, limited zone of the tubular reaction enclosure. With the conventional tubular enclosures which are externally heated over their entire length or over relatively large regions, there will be localized overheated zones resulting from the localized reaction heat. These localized zones have excessively high temperatures which can result not only in a transitory depolymerization, but in addition they can cause thermal damaging of the material.

It is, therefore, a primary object of the present invention to provide a method and apparatus of the above general type which will, however, avoid all of the above drawbacks.

In particular, it is an object of the present invention to provide a method and apparatus which from both the thermal and the flow standpoints are capable of providing a relatively small range of dwell times for the mixture in the enclosure and a highly uniform polymerisate.

According to the method and apparatus of the present invention, the reaction mixture is initially introduced into an initial elongated tubular enclosure which communicates with a subsequent elongated tubular enclosure, and both of these enclosures respectively have heat-exchanging means coacting therewith and described in detail below, these heat-exchanging means providing in the tubular enclosure substantially isothermal reaction temperatures for the mixture.

The invention is illustrated by way of example in the accompanying drawings which form part of this application and in which:

FIG. 1 is a schematic longitudinal sectional elevation of one possible embodiment of a structure according to the invention for carrying out the method of the invention;

FIG. 2 is a transverse section of the structure of FIG. 1 taken along line 2—2 of FIG. 1 in the direction of the arrows;

Figure 3:
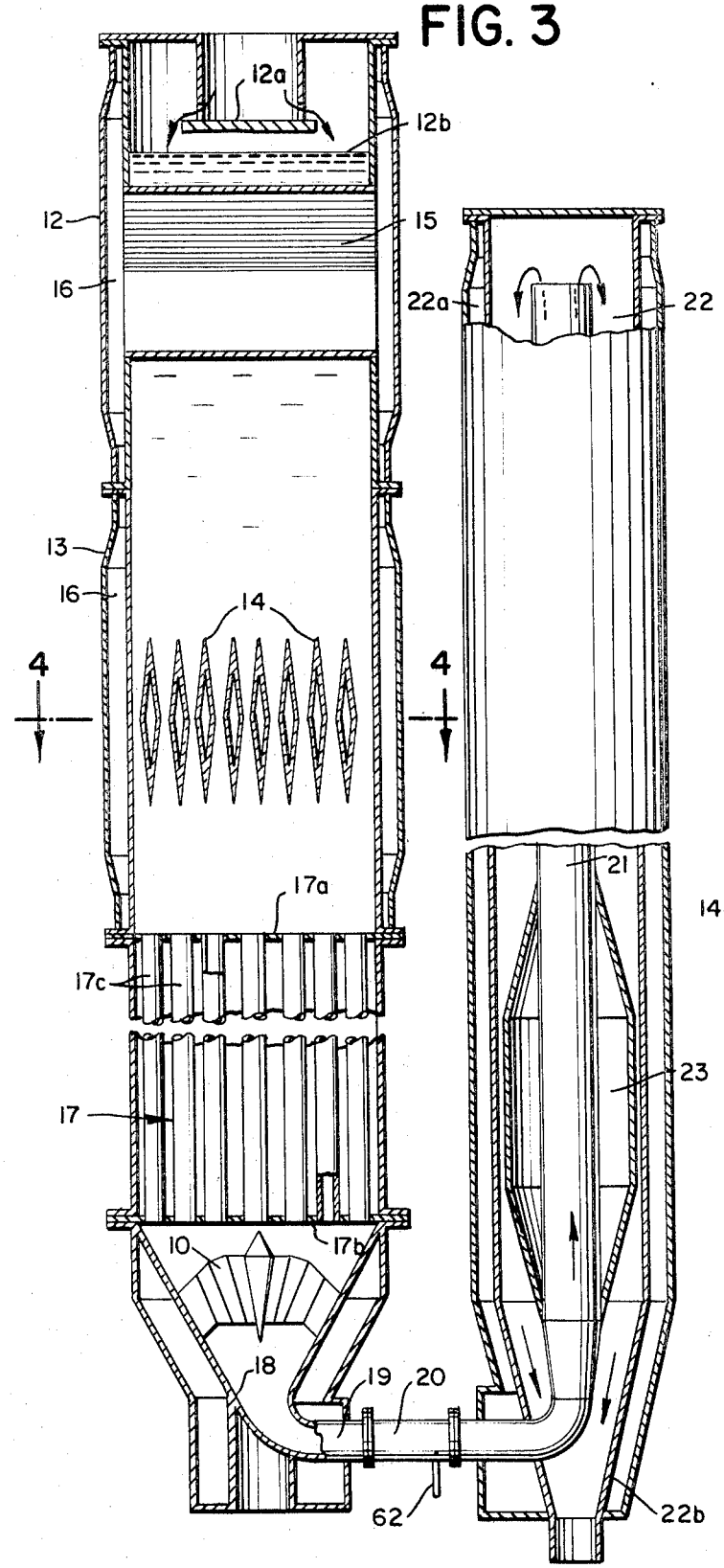
FIG. 3 is a schematic longitudinal section of another embodiment of a structure according to the invention for carrying out the method of the present invention.

Referring now to FIGS. 1 and 2 there is illustrated therein the structure of one embodiment of the invention, this embodiment being composed only of straight tubular enclosures. The structure includes an upper initial tubular enclosure made up of the tubular sections 1, 2, 3, and 4, arranged in series one after the other and communicating with each other, and this initial tubular enclosure 1–4 communicates with the subsequent tubular enclosure 5 which communicates with and follows the section 4. In accordance with the invention a pair of heat-exchanging means respectively coact with both the tubular enclosures for providing substantially isothermal reactions therein. Because of the fact that the embodiment of FIG. 1 is composed exclusively of straight tubular sections which follow one after the other, the undesirable reversal in the direction of the molten mixture is avoided so that extremely good flow characteristics are achieved with the embodiment of FIG. 1.

The mixture is initially introduced into the first section 1 of the initial tubular enclosure through an inlet 1a, as indicated by the arrow 1b. This reaction mixture which is initially introduced has a temperature which is greater than 180° C. where the apparatus is used for the polymerizing of lactams into polyamides. The heat-exchanging means which coacts with the initial tubular enclosure 1–4 includes the outer hollow tubular walls 1c, 2a, 3a, 4a, these hollow walls forming jackets for receiving a suitable fluid heating medium which is directed through these jackets by any suitable conduits and flow-inducing structure, such as suitable pumps or blowers. In addition, the heat-exchanging means includes, for the tubular sections 1–3, a plurality of sets of transversely extending tubes 1d, 2d, and 3d, these sets of transversely extending tubes communicating at their ends with the interiors of the jackets so as to receive the heating medium therefrom. The transverse heating tubes can have the tapered, substantially diamond-shaped cross sectional configurations apparent for the tubes 1d and 3d of FIG. 1. The tubes 2d have the same configuration. However, in accordance with one of the features of the invention the series of tubular sections have their transversely extending tubes respectively arranged perpendicularly one with respect to the other, as is shown by the relationship of the tubes 2d with respect to the tubes 1d, on the one hand, and tubes 3d, on the other hand.

The final section 4 of the initial tubular enclosure carries in its interior a displacing body 4b of annular configuration tapered as indicated in FIG. 1 so as to form a Venturi. A hollow body 4c, having an upper conical portion and a lower tapered portion which terminates in an open end forms in its hollow interior a degassing zone 4d into which gas can escape to be discharged through the tubular gas discharge conduit 8. The exterior of the component 4c together with the liquid displacing body 4b defines an annular Venturi, and the flow of the mixture therethrough is controlled by an annular flow-control member 7 having the tapered configuration apparent from FIG. 1. Through a linkage 7a and a fluid-pressure control unit 7b, it is possible to regulate the axial position of the flow-control body 7 so as to regulate the size of the stream which flows beyond the throat of the Venturi, and in this way the structure forms downstream of the upper end of the component 4c a stream of liquid of predetermined configuration from which gas can escape. The mixture which is introduced into the initial enclosure 1–4 is maintained at the level 1e indicated at the upper part of FIG. 1.

The subsequent tubular enclosure 5, which also acts to maintain a substantially isothermal reaction, has heat-exchanging means in the form of a plurality of outer vertical tubes 5a which have open top ends situated at and communicating with openings in a top wall 5b which closes the bottom end of the tubular section 4. Thus, the mixture from the tubular section 4 will flow downwardly through the series of tubes 5a which may be arranged parallel to the axis of the tube 5. At their bottom ends the tubes 5a respectively communicate with inner tube 5c, and the mixture flows from the tubes 5a upwardly through the inner tube 5c to be received at the top of the wall 5b within a space surrounded by a ring 5d, and from this latter space the mixture reaches the central discharge tube 9 in which the mixture is maintained at the level 9a indicated in FIG. 1.

The tubular enclosure 5, which surrounds the tubes 5a and 5c as well as the tube 9, is filled with a suitable heat-exchanging medium such as diphenyl, and suitable conduits communicate with the interior of the tubular enclosure 5 for directing the diphenyl therethrough so as to provide a heat-exchanging relationship with the mixture which will maintain the latter at the required temperature within the central tube 9. This tube 9 communicates at its bottom end with tapered outlet 6 having in its interior a baffle structure 10 described in greater detail below and serving to direct the fluid in a given direction, this outlet 6 communicating with discharge head 11 which is schematically illustrated and through which the material is discharged from the apparatus of the invention.

As may be seen from FIG. 2, the several tubes 5a of the heat exchanger down which the mixture flows have their bottom ends extending radially into communication with the bottom end of the annular tubular member 5c which surrounds the central discharge tube 9. Actually, the element 5c need only take the form of a relatively large tube coaxially surrounding the inner tube 9 and having a bottom wall of the configuration shown in FIG. 1 so as to communicate properly with the several tubes 5a.

FIG. 3 shows a further development of the method and apparatus of the invention. The initial tubular enclosure of this embodiment includes the tubular sections 12 and 13, and this embodiment also includes at the initial tubular enclosure a heat-exchanger 17 which follows the tubular section 13. These sections 12 and 13 respectively have outer hollow walls forming the jackets 16 of the heat-exchanging means which communicates with and coacts with this embodiment. In addition the heat exchanging-means includes the transversely extending tubes 14 of the section 13, these tubes communicating with the jacket 16 of the tubular section 13, and the upper section 12 includes a series of transverse tubes 15 which may have a configuration similar to those of the tubes 14 and which extend perpendicularly with respect thereto, these tubes 15 also communicating with the interior of the jacket 16 of the section 12. This heat-exchanging medium is directed through the interiors of the tubes 14 and 15 as well as through the jackets 16 through any suitable structure. With this embodiment the mixture is initially directed onto a distributing plate 12a located at the upper part of the section 12 and from which the mixture falls into and along the interior of the tubular section 12, the level of the mixture being shown at 12b.

The heat-exchanger 17 of this embodiment includes an upper wall 17a and a lower wall 17b, the upper wall 17a closing the bottom end of the section 13 and being formed with a series of openings which respectively communicate wth the plurality of tubes 17c all of which extend parallel to the axis of the tubes 12 and 13 with the heat-exchanging tubes 17b being spaced from and parallel to each other and receiving in their interiors the mixture which flows downwardly through the initial tubular enclosure of this embodiment. All of the tubes 17c are surrounded by an outer tube which defines a space surrounding the tubes 17c, and a suitable heat-exchanging medium such as diphenyl is directed through this space in any suitable way.

The bottom wall 17b of the heat-exchanger is also formed with openings communicating with the several tubes 17c respectively, and the mixture discharges through these openings into a tapered outlet 18 in which a baffle 10, described below, is situated. This outlet 18 communicates with a connecting tube 19 in which is situated a throttling means 20 having the construction shown in FIG. 10 and described below.

The subsequent tubular enclosure of FIG. 3 is situated beside the initial tubular enclosure and includes in its interior a central tube 21 communicating with the connecting conduit 19 and receiving the mixture from the throttling means 20. The mixture thus flows upwardly through the central tube 21, in the manner indicated in FIG. 3, and the mixture then overflows through the open top end of the tube 21 so as to flow downwardly along the interior space 22 which surrounds the tube 21. This space 22 is surrounded by a hollow outer tubular wall 22a which forms the outer structure of the subsequent tubular enclosure of this embodiment, and this hollow wall 22a forms a jacket which constitutes the heat-exchanging means of this embodiment, the interior of the jacket having a heat-exchanging medium such as diphenyl flowing therethrough as a result of the action of any suitable structure provided for this purpose, so that in this way the mixture which flows downwardly through the space 22 is maintained at the required temperature.

Surrounded by the lower portion of the heat-exchanging jacket 22a is a liquid displacing means 23 fixed to the exterior of the central tube 21 and having an annular configuration and a cross sectional configuration as indicated in FIG. 3. As a result the flow path for the mixture is narrowed and the mixture is displaced outwardly toward the jacket 22a to flow in the form of a relatively thin annular stream toward the tapered outlet 22b which communicates with the discharge head 11 schematically indicated in FIG. 3.

Figure 4:
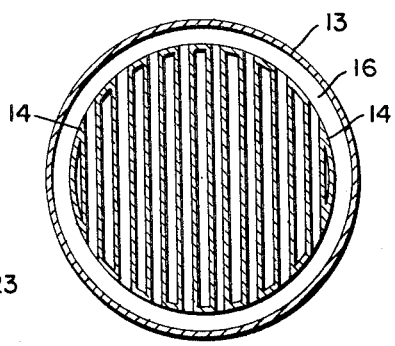
FIG. 4 is a transverse section of the structure of FIG. 3 taken along line 4—4 of FIG. 3 in the direction of the arrows.

FIG. 4 shows the interior of the jacket 16 of the tubular section 13 as well as the transverse tubes 14 which extend across the section 13 and communicate with the jacket 16 thereof.

Within the tubular section 12 the reaction mixture is introduced by way of the distributor 12a and is brought to the reaction temperature. After passing through the tubular sections 12 and 13 in which a homogeneous temperature and uniform flow is achieved for the mixture, the initiating reaction is carried out. After the mixture flows through the sections 12 and 13 a stabilizer is introduced into the mixture in any suitable way. In the heat exchanger 17, a primarily exothermic reaction takes place. The tubular heat exchanger 17, which is surrounded on all sides by an organic heat-carrier, guarantees a good heat exchange and an isothermal performance of the process.

The flow of the mixture from the tubular section 13 can take place past tapered fluid-guiding elements having a conical configuration, for example, so that the molten mixture does not encounter any resistance to flow but instead continues to flow at uniform speed into the individual tubes of the heat-exchanger 17. The tapered outlet 18 reduces the cross section of the flowing stream up to the cross sectional interior area of the connecting conduit 19, and the baffle 10 within the outlet 18 assures a constant speed of flow of the liquid. The throttling means 20 guarantees a stable regulation of the level of the molten mixture in the space 22 which surrounds the tube 21 and which forms the spinning tube. Because of the flow of the molten mixture upwardly through the central tube 21, retarding of the flow which would result in variable dwelling times is reliably avoided. The liquid-displacing body 23 reduces the thickness of the stream up to a thickness of from 1–5 cm., this latter dimension being the annular clearance between the exterior surface of the liquid-displacing body 23 and the interior surface of the jacket 22a. The discharge head 11 has in its interior devices such as filtration devices for filtering the molten material and devices for measuring the viscosity thereof. The latter measurement takes place, for example, by a suitable measurement of the pressure with which the molten stream is directed by a gear pump through a capillary tube. Thus, by providing with this gear pump a constant stream of the molten mixture through the capillary tube, the pressure of the latter stream will indicate the viscosity thereof.

Figure 5:
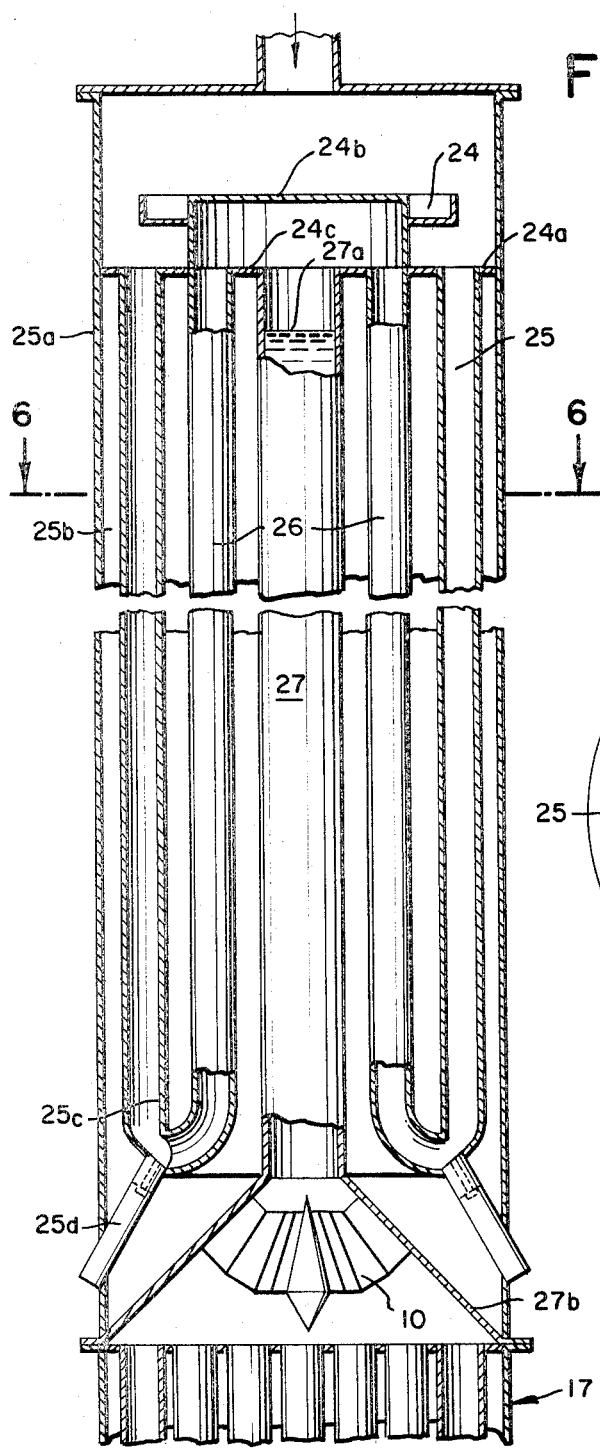
FIG. 5 is a fragmentary schematic sectional elevation of the upper part of a structure according to the present invention, also used for carrying out the method of the present invention.
Figure 6:
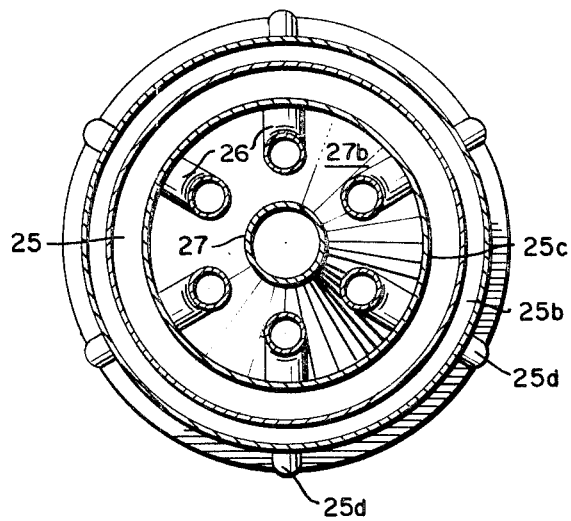
FIG. 6 is a transverse section of the structure of FIG. 5 taken along lines 6—6 of FIG. 5 in the direction of the arrows.

Instead of using the sections 12 and 13 of FIG. 3 it is possible to use the structure shown in FIG. 5 situated over the heat-exchanger 17 which is only fragmentarily illustrated at the lower portion of FIG. 5. Thus, referring to FIG. 5 it will be seen that the elongated initial tubular enclosure of this embodiment includes above the heat-exchanger 17 an outer elongated tubular member 25a which carries in its inner upper portion a distributor 24 onto which the mixture is initially directed so as to flow over the latter downwardly along the interior of the enclosure 25a, as indicated by the arrows in FIG. 5. The outer wall of the enclosure 25a is also hollow so as to form a jacket 25b, indicated in FIG. 6, and this jacket is adapted to have any suitable heat-exchanging medium flowing therethrough. The inner wall of the jacket 25b defines thes elongated tubular chamber 25 which is of the circular cross sectional configuration indicated in FIG. 6, and the liquid which falls from the distributor 24 flows downwardly through the ring-shaped elongated tubular space 25.

The distributor 24 is carried by a hollow circular member 24b, and the bottom wall 24c thereof is formed with a series of openings communicating with the open top ends of a plurality of inner vertical tubes 26. These inner tubes 26 respectively have bottom curved ends which communicate with openings at the bottom end of an inner wall 25c which defines the inner limit of the space 25, so that the liquid mixture from the space 25 flows into and upwardly along the several tubes 26 to reach the upper surface of the wall 24c in the hollow interior of the body 24b, and to flow therefrom downwardly along the interior of the central tube 27 which communicates at its top end with the hollow interior of the hollow body 24d, the level of the mixture in the central tube 27 being shown at 27a.

The wall 25c surrounds a space in which the tubes 26 and 27 are located, and this space is adapted to receive a heat-exchanging medium such as diphenyl, this medium being introduced, for example, by the tube 25d. The heat-exchanging medium is circulated through this space and also through the jacket 25b in any suitable way. The bottom end of the central tube 27 communicates with an outwardly flying guide 27b in which the baffle 10 is located, and in this way the mixture is delivered to the heat exchanger 17.

Thus, the reaction mixture is introduced by way of the distributor 24 so as to flow in sequence through the space 25 and the tubes 26 and 27, and the entire system of tubes is surrounded by the organic heat carrier. The baffle 10 of FIG. 5 has the construction shown in FIG. 9 and serves to maintain the molten material flowing at a constant speed into the heat-exchanger 17.

Figure 7:
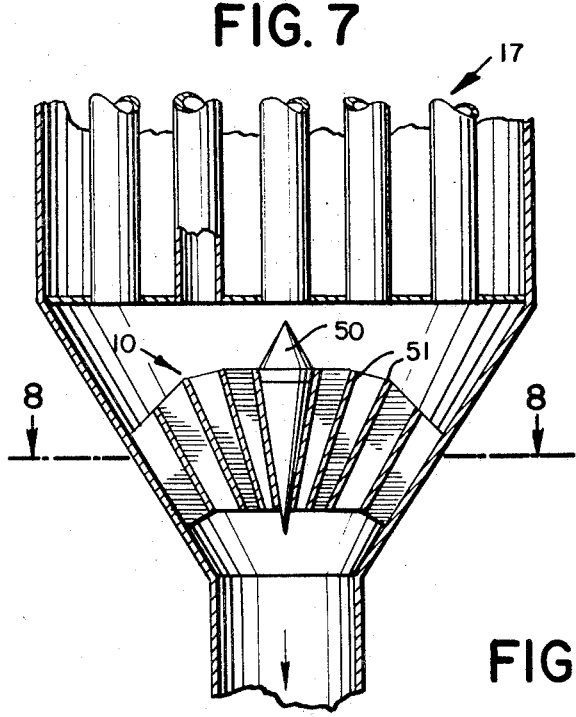
FIG. 7 is a fragmentary schematic sectional elevation of a baffle structure of the invention.
Figure 8:
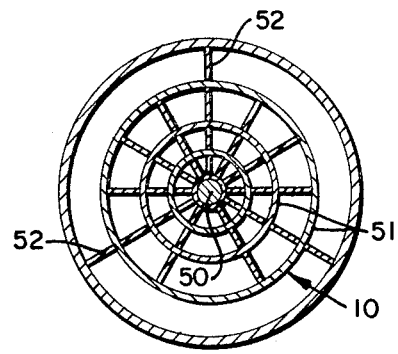
FIG. 8 is a transverse section of the structure of FIG. 7 taken along line 8—8 of FIG. 7 in the direction of the arrows.
Figure 9:
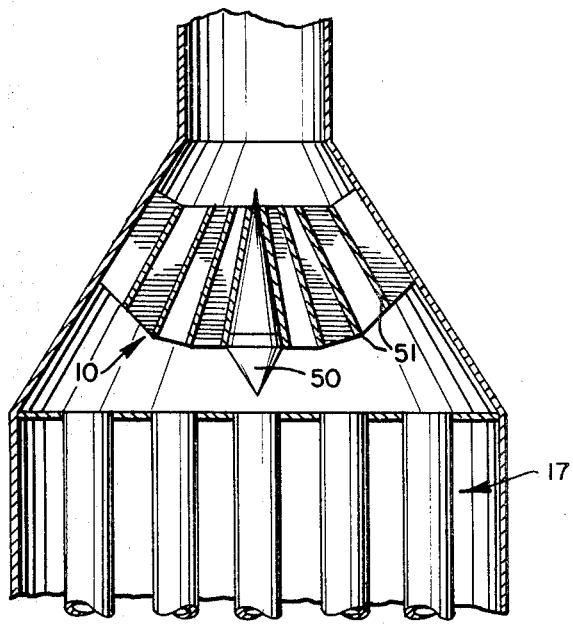
FIG. 9 is a fragmentary sectional elevation schematically illustrating another arrangement of the baffle structure of FIGS. 7 and 8.

While the baffle structure 10 of FIG. 9 is adapted for use in the embodiment of FIG. 5, the baffle structure 10 of FIGS. 7 and 8 is adapted for use in the embodiments of FIGS. 1 and 3. These baffle structures are identical except that the baffle 10 of FIG. 9 is inverted with respect to the baffle 10 of FIGS. 7 and 8.

Referring to FIGS. 7 and 8, it will be seen that the baffle 10 includes a central solid flow-controlling body 50 which has the illustrated double-conical configuration, and this body 50 is surrounded by a plurality of concentric funnel-shaped baffle members 51 which are respectively carried by the radial plates 52 in the manner indicated in FIG. 8. In this way the series of concentric funnel-shaped baffle elements together with the flow-controlling body 50 will maintain a constant speed of flow for the liquid.

Figure 10:
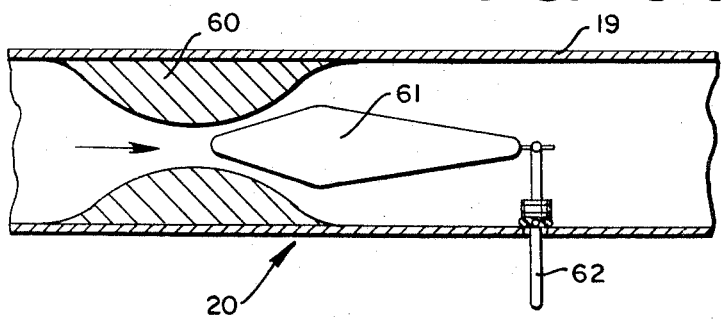
FIG. 10 is a schematic sectional elevation of a flow-controlling structure forming part of the apparatus of the invention.

The details of the throttle means 20 are illustrated in FIG. 10. Thus, it will be seen that a portion of the conduit 19 is provided in its interior with an annular Venturi member 60, and an adjustable double-conical flow-control member 61 extends into the interior of the Venturi 60 to the region of the throat thereof. At its right end, as viewed in FIG. 10, the body 61 is connected to an adjusting means 62 which may be adjusted so as to control the axial position of the body 61 and thus the throttling means 20 can be adjusted so as to provide a predetermined ring-shaped stream of liquid which in the embodiment of FIG. 3 flows through the throttling means 20 from the initial tubular enclosure into the subsequent tubular enclosure.

It has been found, according to the present invention, that uniform polymerization can be achieved if an isothermal reaction is carried out at all parts of the tubular enclosure, irrespective of the particular configuration thereof, this isothermal reaction being achieved by the delivery of heat to and from the tubular enclosures with the heat-exchanging means described above. The reaction mixture which is delivered into the polymerizing container at a temperature of more than 180° C., so as to guarantee a density which is the same or smaller than that of the molten polycaproamide, is brought to the reaction temperature by way of the jacketing and transverse tubes which form the heat-exchanging structure for the initial tubular enclosures of the embodiments of the invention described above. The mixture then flows through the tubular heat-exchanger system of the subsequent tubular enclosure of the invention, this system including tubes such as outer tube through which the mixture flows downwardly and an inner tube through which the mixture flows upwardly, the system also including, as indicated above, a central tube which receives the mixture.

Before the molten mixture reaches the subsequent tubular enclosure of the invention, degassing thereof can take place as described above in connection with FIG. 1. In the reaction zone the energy which is received as a result of the exothermic action is immediately carried away. In this way viscosity variations resulting from temperature changes are avoided. A thermal damaging of the lactams and polyamides is thus not possible. The addition of the stabilizer is delayed and takes place only after an approximately 50% conversion of the lactam.

The baffle 10 provides not only a uniform speed of flow for the liquid but also a predetermined direction of flow thereof to the discharge head.

In the degassing zone, such as that of FIG. 1, for example, the outer liquid-displacing body 4b provides an annular gap of predetermined width through which the liquid flows. The size of the cross section of the stream is regulated by adjustment of the annular flow-controlling body 7. This body, by its adjustment, serves to control the level of the molten material in the heat-exchanger. Thus, the cross section of the stream provided by the body 7 will depend upon the axial position thereof. As a result of this construction, the molten material flows through the annular gap in the form of a thin stream to the tubular heat exchanger, and because it is in the form of a thin stream, the molten material can be degassed. The vapors resulting from the degassing are carried out of the space 4d by way of the tube 8.

While the heat-exchanger 17 or the heat-exchanger in the subsequent tubular enclosure 5 of the embodiment of FIG. 1 can be in the form of tubes which extend continuously through the tubular housings in which they are situated, it is also possible to provide a tubular heat-exchanger composed of a plurality of horizontally separated units so as to further improve the flow characteristics.

The throttling means 20 prevents any dead areas where the fluid accumulates without continuously flowing. In the embodiment of FIG. 3, the thin annular stream into which the molten material is converted by the body 23 provides in the liquid material an additional heat-exchange and homogenizing thereof before the material reaches the discharge 11 of FIG. 3, so that in this way when the polymerisate sets it will have a uniform molecular structure.

With the method and apparatus of the present invention there is achieved immediately upon the introduction of the reaction mixture into the initial tubular enclosure the full value of the reaction temperature, so that excessive portions of initiating agents can become immediately degassed during the hydrolitic polymerization, without forming during the further continuation of the method large gas bubbles which escape in a direction counter to the desired direction of flow.

With the apparatus of the invention there is a uniform flow of the mixture particularly at those locations where the cross section of the stream changes.

Thus, with the method and apparatus of the invention it is possible to achieve results which cannot be achieved by heretofore known methods and apparatus, and as a result of the method and apparatus of the invention there is a very substantial improvement in the quality of the polymerisate.

What is claimed is:

1. In an apparatus for continuously polymerizing lactams into polyamides, an initial elongated tubular enclosure for receiving an initial reaction mixture, a subsequent elongated tubular enclosure communicating with said initial enclosure for receiving the mixture therefrom, a pair of heat-exchanging means respectively coacting with said enclosures for producing a substantially isothermal reaction therein, situated between said initial and subsequent tubular enclosures throttling means comprising a venturi through which the mixture flows and an elongated tapered member extending into the venturi toward the throat thereof and providing a tubular stream from the mixture flowing through the venturi, and adjusting means operatively connected to said tapered member for adjusting the latter with respect to said venturi so as to control the cross-section of said tubular stream.

2. In an apparatus for continuously polymerizing lactams into polyamides, an initial elongated tubular enclosure for receiving an initial reaction mixture, a subsequent elongated tubular enclosure communicating with said initial enclosure for receiving the mixture therefrom, a pair of heat-exchanging means respectively coacting with said enclosures for producing a substantially isothermal reaction therein, situated in the interior of said initial enclosure adjacent to said subsequent enclosure an inner annular venturi and an annular throttle member coacting with said venturi for providing from the mixture a stream of a given cross-section from which gas can escape, adjustable means coacting with said throttle member for adjusting the latter with respect to said venturi so as to control said cross-section of said stream, and gas-discharge means communicating with the interior of said initial enclosure for discharging from the latter the gas which escapes from the stream.

3. In an apparatus for continuously polymerizing lactams into polyamides, an initial elongated tubular enclosure for receiving an initial reaction mixture, a subsequent elongated tubular enclosure communicating with said initial enclosure for receiving the mixture therefrom, a pair of heat-exchanging means respectively coacting with said enclosures for producing a substantially isothermal reaction therein, said heat-exchanging means which coacts with said initial enclosure including an outer elongated hollow member of annular cross-section situated within said initial enclosure and surrounding a closed space therein, one end of said elongated hollow member being open for admission of the mixture into the closed space, and a plurality of tubes surrounded by said outer hollow member and communicating at the other end of the outer hollow member with the closed space for receiving the mixture from the closed space, and a central tube communicating with said plurality of tubes for receiving the mixture therefrom, said initial enclosure defining a closed space surrounding said hollow member and the tubes surrounded thereby and the closed space defined by the initial enclosure being adapted to receive a fluid heat-exchanging medium.

4. In an apparatus for continuously polymerizing lactams into polyamides, an initial elongated tubular enclosure for receiving an initial reaction mixture, a subsequent elongated tubular enclosure communicating with said initial enclosure for receiving the mixture therefrom, a pair of heat-exchanging means respectively coacting with said enclosures for producing a substantially isothermal reaction therein, said heat-exchanging means which coacts with said initial enclosure including an outer jacket forming an outer wall of said initial enclosure and adapted to contain a heat-exchanging medium in its interior, and a plurality of tubes of elongated cross-section extending transversely through said initial enclosure and communicating with said jacket for conveying the heat-exchanging medium transversely through the body of the mixture in said initial enclosure as well as surrounding the latter body with the heat-exchanging medium in said jacket, the tubes each being oriented with the long dimension of the cross section substantially parallel to the axis of the initial tubular enclosure.

5. The combination of claim 4 and wherein said initial enclosure has a plurality of tubular sections one following the other and all of which have outer hollow jackets forming the outer walls thereof, respectively, and all of said tubular sections also having a plurality of said tubes respectively extending transversely therethrough and communicating with said jackets thereof, the tubes of one of said tubular sections extending horizontally in a plane parallel to the plane of the tubes of a subsequent tubular section, the tubes of the one section being oriented at 90° from the tubes of the subsequent section.

6. The combination of claim 4 and wherein an outlet communicates with said subsequent enclosure for participating in the discharge of the mixture therefrom, said outlet carrying in its interior a central liquid guiding body and a plurality of concentric funnel-shaped baffles spaced from each other and coaxially surrounding said body.

7. The combination of claim 4 and wherein said initial enclosure has three tubular sections situated one after the other, the first two of said sections including outer hollow walls forming jackets of said heat-exchanging means which coacts with said initial enclosure, said first two sections also respectively carrying transversely extending tubes which communicate with said jackets and which are arranged with the tubes of one section extending horizontally in a plane parallel to the plane of the tubes of a subsequent tubular section, the tubes of the one section being oriented at 90° from the tubes of the subsequent section, so that said transversely extending tubes also form part of said heat-exchanging means which coacts with said initial enclosure, and said third tubular section of said initial enclosure having in its interior a set of tubes, sad tubes of said third section also forming part of said heat-exchanging means which coacts with said initial tubular enclosure, all of said transversely extending tubes being of elongated cross-section with the long dimension of the cross section substantially parallel to the axis of the initial enclosure.

8. The combination of claim 7 and wherein concentrically positioned on the axis of the subsequent tublar enclosure is a body a peripheral portion of which together with an interior portion of the walls of the subsequent tubular enclosure defines an annular space for flow therethrough of the mixture.

References Cited

UNITED STATES PATENTS

| | | | |
|---|---|---|---|
| 1,444,256 | 2/1923 | Lidholm | 23—285 XR |
| 1,686,227 | 10/1928 | Davis et al. | 165—106 |
| 1,841,557 | 1/1932 | Storms | 165—157 XR |
| 2,343,560 | 3/1944 | Klein et al. | 23—288 XR |
| 2,468,903 | 5/1949 | Villiger | 165—160 XR |
| 2,491,618 | 12/1949 | Luetzelschwab | 23—285 |
| 2,496,653 | 2/1950 | Allen et al. | 23—285 XR |
| 2,610,109 | 9/1952 | Adams et al. | 23—276 XR |
| 2,673,791 | 3/1954 | McIntire | 23—284 |
| 2,745,823 | 5/1956 | Hewitt | 23—285 XR |
| 3,147,207 | 9/1964 | Doumani | 23—288 XR |
| 3,250,747 | 5/1966 | Mitchell et al. | 23—285 XR |
| 3,296,217 | 1/1967 | Tate | 23—285 XR |

FOREIGN PATENTS

| | | |
|---|---|---|
| 10,192 | 1907 | Great Britain. |
| 722,889 | 1955 | Great Britain. |
| 567,645 | 1958 | Canada. |

MORRIS O. WOLK, Primary Examiner

D. G. MILLMAN, Assistant Examiner

U.S. Cl. X.R.

23—283; 165—115, 159, 160, 164, 172, 177